(12) United States Patent
Stojanovski et al.

(10) Patent No.: US 9,736,672 B2
(45) Date of Patent: Aug. 15, 2017

(54) TARGETED GROUP-BASED DISCOVERY FOR WIRELESS COMMUNICATION DEVICES

(71) Applicants: Alexandre Stojanovski, Paris (FR); Muthaiah Venkatachalam, Beaverton, OR (US); Kerstin Johnsson, Palo Alto, CA (US); Achim Luft, Braunschweig (DE); Pingping Zong, Randolph, NJ (US)

(72) Inventors: Alexandre Stojanovski, Paris (FR); Muthaiah Venkatachalam, Beaverton, OR (US); Kerstin Johnsson, Palo Alto, CA (US); Achim Luft, Braunschweig (DE); Pingping Zong, Randolph, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/762,762

(22) PCT Filed: Dec. 13, 2013

(86) PCT No.: PCT/US2013/074871
§ 371 (c)(1),
(2) Date: Jul. 22, 2015

(87) PCT Pub. No.: WO2014/130144
PCT Pub. Date: Aug. 28, 2014

(65) Prior Publication Data
US 2015/0359023 A1    Dec. 10, 2015

Related U.S. Application Data

(60) Provisional application No. 61/768,330, filed on Feb. 22, 2013.

(51) Int. Cl.
*G06F 15/16* (2006.01)
*H04W 8/00* (2009.01)
(Continued)

(52) U.S. Cl.
CPC ......... *H04W 8/005* (2013.01); *H04L 12/4633* (2013.01); *H04L 27/2614* (2013.01);
(Continued)

(58) Field of Classification Search
USPC ....................................................... 370/329
See application file for complete search history.

(56) References Cited

U.S. PATENT DOCUMENTS 5,907,794 A * 5/1999 Lehmusto ............ H04B 7/2606
455/11.1
2005/0135305 A1    6/2005 Wentink
(Continued)

OTHER PUBLICATIONS

International Search Report and Written Opinion for PCT/US2013/074871 dated Nov. 20, 2014.
(Continued)

*Primary Examiner* — Edan Orgad
*Assistant Examiner* — Sithu Ko
(74) *Attorney, Agent, or Firm* — Ledell Ansari, LLP (57) ABSTRACT

Techniques described herein may provide for device discovery of direct communication paths, to enable direct mode communication, between communication devices. The discovery of the communication paths may be based on identifiers that may be defined at the application level and included in device discovery requests. In one implementation, the identifiers may be SIP-URIs (session initiation protocol (SIP)-uniform resource identifiers (URIs)).

20 Claims, 9 Drawing Sheets

(51) Int. Cl.
| | |
|---|---|
| H04W 72/04 | (2009.01) |
| H04W 74/02 | (2009.01) |
| H04W 76/02 | (2009.01) |
| H04W 72/00 | (2009.01) |
| H04W 76/04 | (2009.01) |
| H04L 12/46 | (2006.01) |
| H04W 4/00 | (2009.01) |
| H04L 29/12 | (2006.01) |
| H04W 28/02 | (2009.01) |
| H04W 40/02 | (2009.01) |
| H04W 48/18 | (2009.01) |
| H04W 24/06 | (2009.01) |
| H04W 74/00 | (2009.01) |
| H04W 74/04 | (2009.01) |
| H04W 74/08 | (2009.01) |
| H04W 36/00 | (2009.01) |
| H04W 36/30 | (2009.01) |
| H04L 27/26 | (2006.01) |
| H04W 40/24 | (2009.01) |
| H04W 24/02 | (2009.01) |
| H04W 48/14 | (2009.01) |
| H04W 52/02 | (2009.01) |
| H04W 28/12 | (2009.01) |
| H04L 12/801 | (2013.01) |
| H04W 48/08 | (2009.01) |
| H04W 48/16 | (2009.01) |
| H04W 88/06 | (2009.01) |
| H04L 12/725 | (2013.01) |
| H04W 28/08 | (2009.01) |
| H04W 84/12 | (2009.01) |

(52) U.S. Cl.
CPC ............. *H04L 47/11* (2013.01); *H04L 47/12* (2013.01); *H04L 61/2514* (2013.01); *H04L 61/2525* (2013.01); *H04L 61/2539* (2013.01); *H04L 61/2564* (2013.01); *H04L 61/2575* (2013.01); *H04L 61/2592* (2013.01); *H04L 61/6077* (2013.01); *H04W 4/005* (2013.01); *H04W 4/008* (2013.01); *H04W 24/02* (2013.01); *H04W 24/06* (2013.01); *H04W 28/02* (2013.01); *H04W 28/0289* (2013.01); *H04W 28/12* (2013.01); *H04W 36/0088* (2013.01); *H04W 36/30* (2013.01); *H04W 40/02* (2013.01); *H04W 40/244* (2013.01); *H04W 48/08* (2013.01); *H04W 48/14* (2013.01); *H04W 48/16* (2013.01); *H04W 48/18* (2013.01); *H04W 52/028* (2013.01); *H04W 52/0216* (2013.01); *H04W 72/005* (2013.01); *H04W 72/0413* (2013.01); *H04W 72/0446* (2013.01); *H04W 74/002* (2013.01); *H04W 74/02* (2013.01); *H04W 74/04* (2013.01); *H04W 74/08* (2013.01); *H04W 76/023* (2013.01); *H04W 76/043* (2013.01); *H04L 45/30* (2013.01); *H04W 28/08* (2013.01); *H04W 84/12* (2013.01); *H04W 88/06* (2013.01); *Y02B 60/50* (2013.01)

(56) References Cited

U.S. PATENT DOCUMENTS

| | | | |
|---|---|---|---|
| 2006/0053225 A1* | 3/2006 | Poikselka | H04L 12/1818 709/227 |
| 2007/0171910 A1* | 7/2007 | Kumar | H04L 63/0428 370/392 |
| 2007/0201390 A1* | 8/2007 | Kim | H04W 4/18 370/310.2 |
| 2007/0274233 A1 | 11/2007 | Ptashek et al. | |
| 2010/0011108 A1* | 1/2010 | Clark | H04W 76/002 709/227 |
| 2010/0083311 A1 | 4/2010 | Vare et al. | |
| 2010/0279717 A1 | 11/2010 | Venkatachalam et al. | |
| 2011/0103264 A1* | 5/2011 | Wentink | H04W 8/005 370/255 |
| 2011/0153773 A1* | 6/2011 | Vandwalle | H04W 8/005 709/217 |
| 2013/0034082 A1 | 2/2013 | Etemad et al. | |
| 2013/0204962 A1* | 8/2013 | Estevez | H04N 7/185 709/217 |

OTHER PUBLICATIONS

3GPP Organizational Partners; 3GPP TR 22.803, 3rd Generation Partnership Project, Technical Specification Group Services and Systems Aspects; Feasibility study for Proximity Services (ProSe) (Release 12); Jun. 2013; Available at http://www.3gpp.org.

3GPP Organizational Partners; 3GPP TS 22.468, 3rd Generation Partnership Project, Technical Specification Group Services and System Aspects; Group Communication System Enablers for LTE (GCSE_LTE) (Release 12); Jun. 2013; Available at http://www.3gpp.org.

3GPP TR 23.703 V0.2.0 (Apr. 2013), Technical Specification Group Services and Systems Aspects; Study on architecture enhancements to support Proximity Services (ProSe) (Release 12) (available at www.3gpp.org).

3GPP TR 23.703 V0.4.1 (Jun. 2013), Technical Specification Group Services and Systems Aspects; Study on architecture enhancements to support Proximity Services (ProSe) (Release 12) (available at www.3gpp.org).

Open Mobile Alliance; Push to Talk Over Cellular (PoC) Architecture; Aug. 2011; Available at http://www.openmobilealliance.org.

WiFi Alliance; Wi-Fi Certified Wi-Fi Direct, Personal, Portable Wi-Fi to Connect Devices Anywhere, Any Time; Oct. 2010; Available at http://www.wi-fi.org.

* cited by examiner

TARGETED GROUP-BASED DISCOVERY FOR WIRELESS COMMUNICATION DEVICES

RELATED APPLICATIONS

The present application claims the benefit of U.S. Provisional Patent Application No. 61/768,330, which was filed on Feb. 22, 2013, and which is hereby incorporated by reference as though fully set forth herein.

BACKGROUND

Wireless networks may provide network connectivity to mobile communication devices, such as smart phones. The network connectivity may be provided through radio interfaces. Typically, the devices may connect to a network through an access point that is part of the network infrastructure. For example, a device may connect to a cellular base station or a wireless local area network (WLAN) access point (e.g., a WiFi access point).

Some techniques may allow devices to establish direct communication paths with one another (e.g., without going through a cellular base station or WiFi access point). For example, devices that are located in proximity to one another may discover one another and subsequently establish direct communication paths with one another. In one such technique, called WiFi Direct®, devices may discover one another by broadcasting local discovery requests that use the media access control addresses (MAC addresses), of the participating devices, to identify the devices.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may provide for device discovery of direct communication paths, to enable direct mode communication, between communication devices (called "user equipment" (UE) herein). The discovery of the communication paths may be based on identifiers that may be defined at the application level and included in a device discovery requests that are implemented at the Open Systems Interconnection (OSI) Layer 1/Layer 2 level. In one implementation, the identifiers may be SIP-URIs (session initiation protocol (SIP)-uniform resource identifiers (URIs)). The identifiers may include group identifiers which may potentially each be associated with a number of members (e.g., UEs). The identifiers may additionally or alternatively include user identifiers which may each be associated with a user of one or more UEs. The identifiers may be assigned independently of the hardware associated with the UEs. That is, the identifiers may be assigned at the application level. Members associated with a group identifier may be modified as desired by an administrator or other user.

By using application level identifiers additional flexibility can be obtained in managing users and groups of users. For example, a group may be defined based on users in the group instead of as a group of UEs. Group members can be added to a group without having to update UEs that were previously in the group.

In one implementation, device discovery of direct communication paths may be used as part of direct communications between cellular UEs, such as direct communications discussed in the technical specification "3GPP TR 22.803, Technical Specification Group Services and Systems Aspects; Feasibility study for Proximity Services (ProSe) (Release 12)" (available at www.3gpp.org).

In one implementation, a UE may include processing circuitry to: receive a first application layer identifier that identifies a user of the UE; form a layer-2 frame, the layer-2 frame including a field designating the layer-2 frame as a device discovery frame for discovery using direct mode signaling between the UE and one or more other UEs, the first application layer identifier, and a second application layer identifier corresponding to one or more other users, associated with the one or more other UEs, with which discovery using direct mode signaling is to be performed; and wirelessly broadcast the layer-2 frame.

The first and second application layer identifiers may include session initiation protocol (SIP)-uniform resource identifiers (URIs).

In an implementation, forming the layer-2 frame may further include forming the layer-2 frame to additionally include a layer-2 address of the communication device.

In an implementation, the UE may further include processing circuitry to receiving a response, from the one or more other UEs, to the layer-2 frame; and completing, based on the response, direct mode communication between the UE and the one or more other UEs.

The first and second application layer identifiers may be received via communications with an Internet Protocol (IP) Multimedia Subsystem (IMS) service in a Long Term Evolution (LTE) network.

In an implementation, the UE may further include processing circuitry to form the layer-2 frame based on a determination that network connectivity to a cellular wireless network is unavailable.

In another implementation, a method for performing discovery of devices using direct mode signaling may include receiving, from a server, a first application layer identifier that identifies a group in which a user of the communication device is a member; receiving, from the server, a first multicast layer-2 address that corresponds to the first application layer identifier; and receiving, from a second communication device, a layer-2 frame. The layer-2 frame may include a field including a layer-2 address of the second communication device; a field designating the layer-2 frame as a device discovery frame for direct mode discovery between the communication device and the second communication device; and a second multicast layer-2 address. The method may further include establishing, by the communication device, direct mode communications with one or more members of the group, including the second communication device, when the first multicast layer-2 address matches the second multicast layer-2 address.

The layer-2 address, the first multicast layer-2 address, and the second multicast layer-2 address may be six octet values.

The first application layer identifier may include a SIP-URI.

The first application layer identifier may be received via communications with an Internet Protocol (IP) Multimedia Subsystem (IMS) service in a Long Term Evolution (LTE) network.

In yet another implementation, a communication device may include processing circuitry to store a first application layer identifier that identifies a group in which a user of the communication device is a member; store a first multicast layer-2 address that corresponds to the first application layer identifier; receive, from a second communication device, a layer-2 frame, the layer-2 frame including a field including a layer-2 address of the second communication device, a field designating the layer-2 frame as a device discovery frame for discovery using direct mode signaling between the communication device and the second communication device, and a second multicast layer-2 address; and complete discovery using direct mode signaling with one or more members of the group, including the second communication device, when the first multicast layer-2 address matches the second multicast layer-2 address.

In another implementation, a communication device may perform discovery of devices using direct mode signaling, the communication device may include means for storing a first application layer identifier that identifies a user of the communication device; means for forming a layer-2 frame, the layer-2 frame including a field designating the layer-2 frame as a device discovery frame for discovery using direct mode signaling between the communication device and one or more other devices, the first application layer identifier, and a second application layer identifier corresponding to one or more other users, associated with the one or more other devices, with which discovery using direct mode signaling is to be performed; and means for wirelessly broadcasting the layer-2 frame.

In another implementation, a system for performing discovery of devices using direct mode signaling may include a coordination server to: maintain a set of application layer group identifiers that each correspond to a plurality of users, and maintain a set of application layer user identifiers that each correspond to a particular user. A communication device may include a memory to store instructions; and at least one processor to execute the instructions stored by the memory to: receive, from the coordination server, one of the application layer group identifiers as an identifier of a group for which a user of the communication device is a member; receive, from a second communication device, a layer-2 frame, the layer-2 frame including a field designating the layer-2 frame as a device discovery frame for direct mode discovery between the communication device and the second communication device, and a second application layer group identifier; and establish direct mode communications with the second communication device when the first multicast layer-2 address matches the second multicast layer-2 address.

Figure 1:
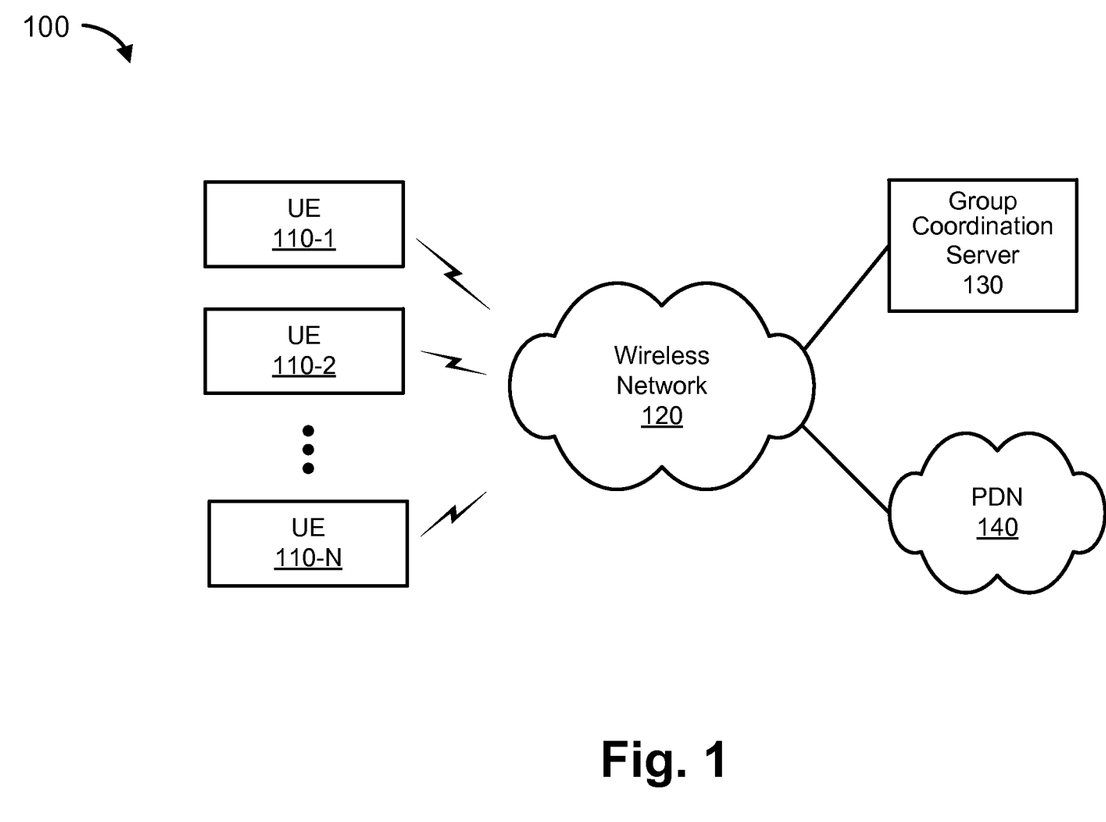
FIG. 1 is a diagram of an example environment in which systems and/or methods described herein may be implemented.

FIG. 1 is a diagram of an example environment 100 in which systems and/or methods described herein may be implemented. As illustrated, environment 100 may include one or more UEs 110-1 through 110-N (referred to collectively herein as "UEs 110" or individually as "UE 110"), wireless network 120 to provide network connectivity to UEs 110 and/or with other networks, group coordination server 130, and an external network, such as a packet data network (PDN) 140.

UEs 110 may include portable computing and communication devices, such as a personal digital assistant (PDA), a smart phone, a cellular phone, a laptop computer with connectivity to a cellular wireless network, a tablet computer, etc. UEs 110 may also include non-portable computing devices, such as desktop computers, consumer or business appliances, or other devices that have the ability to connect to wireless network 120. UEs 110 may connect, through a radio link, to wireless network 120. UEs 110 may also connect directly to one another using a direct communication path (e.g., via direct mode communication that does not use wireless network 120).

Wireless network 120 may include one or more networks that provide wireless network connectivity to UEs 110. For example, wireless network 120 may represent a wireless network that provides cellular wireless coverage or a network accessed through WiFi access points (e.g., Institute of Electrical and Electronics Engineers' (IEEE) 802.11 access points). In some implementations, wireless network 120 may be associated with a Long Term Evolution (LTE) network.

Group coordination control server 130 may include one or more computation and communication devices that maintain application level identifiers associated with users of UEs 110 and/or a group of users associated with UEs 110. The identifiers may be used to facilitate discovery of direct communication paths between UEs 110. Group coordination server 130 may transmit the identifiers associated with a particular user or group of UEs. For example, a particular UE 110-1 may store a first identifier that may identify the user of UE 110-1 and a second identifier that may identify a group to which the user belongs. In one implementation, the identifiers maintained by group coordination server 130 and transmitted to UEs 110 may include SIP-URIs.

Although referred to as a "server," group coordination server 130 may correspond to a traditional server, a cloud-based service, a cluster of blade or rack-mounted servers, or another device or set of devices that provide services and/or data storage. Additionally, although illustrated in FIG. 1 separately from wireless network 120, in some implementations, group coordination server 130 may be implemented as part of wireless network 120. For example, in situations in which wireless network 120 includes a Long Term Evolution (LTE) network that uses an IP Multimedia Subsystem (IMS) to deliver IP multimedia services, group coordination server 130 may be implemented as an application server in the IMS.

PDN 140 may include one or more packet-switched networks, such as an Internet Protocol (IP)-based packet-switched network. PDN 140 may include a wide area network (WAN), a local area network (LAN), and/or combinations of WANs and LANs. UEs 110 may access PDN 140, through wireless network 120, to obtain computation and/or data services (e.g., streaming video services, file transfer services, etc.) from computing devices, such as from servers connected to PDN 140.

Figure 2:
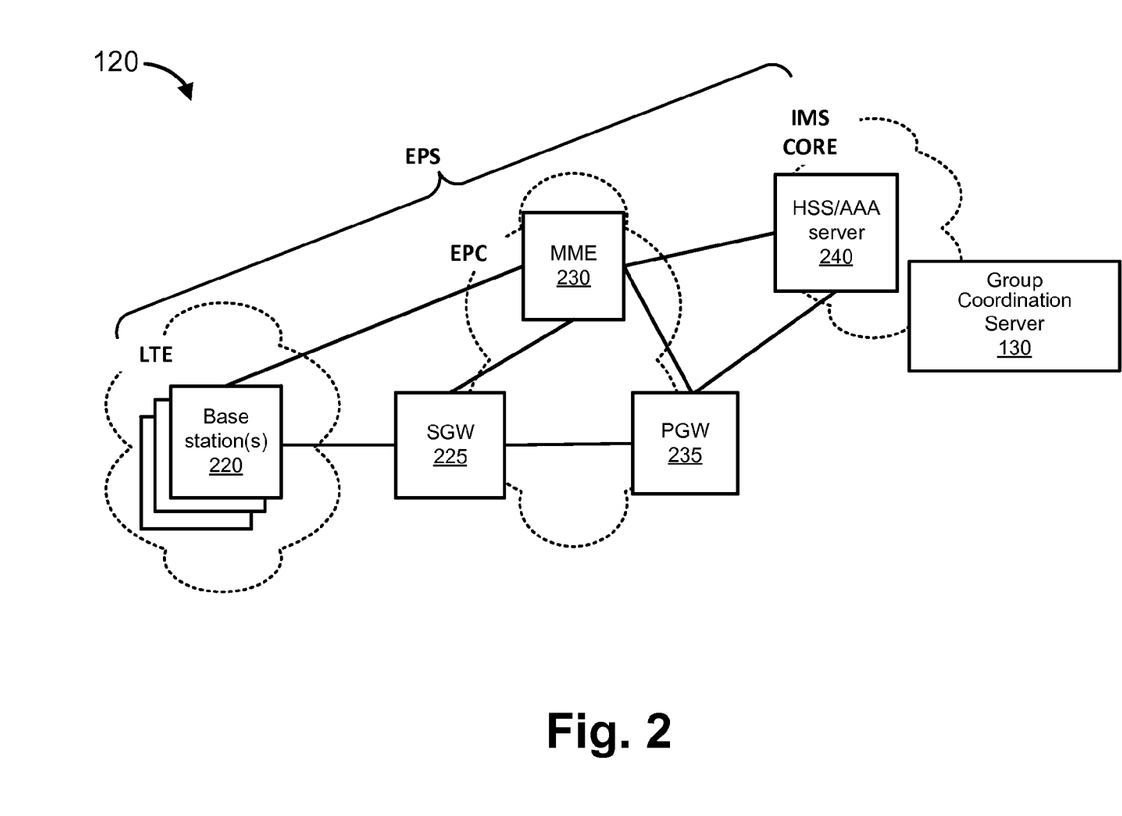
FIG. 2 is a diagram of an example implementation of a wireless network.

FIG. 2 is a diagram of an example implementation of wireless network 120. In FIG. 2, wireless network 120 may include an evolved packet system (EPS) that includes a LTE network and/or an evolved packet core (EPC) network that operates based on a third generation partnership project (3GPP) wireless communication standard. The LTE network may be, or may include, a radio access network that includes one or more base stations 220, some or all of which may take the form of an eNodeB (eNB), via which UEs 110 may communicate with the EPC network. The EPC network may include one or more serving gateways (SGWs) 225, mobility management entities (MMEs) 230, and/or packet data network gateways (PGWs) 235, and may enable UEs 110 to communicate with an external network, and/or an IMS core network. The IMS core network may include HSS/AAA server 240, which may manage authentication, session initiation, account information, a user profile, etc. associated with UEs 110.

Base stations 220 may include one or more network devices that receive, process, and/or transmit traffic destined for and/or received from UEs 110. In one example, base stations 220 may each be an eNB device and may be part of the LTE network. Base stations 220 may receive traffic from and/or send traffic to external networks, such as PDN 140, via PGW 235. Base stations 220 may send traffic to and/or receive traffic from UEs 110 via air interfaces.

SGW 225 may include one or more network devices that route and data of a traffic flow. SGW 225 may aggregate traffic received from one or more base stations 220 and may send the aggregated traffic to an external network via PGW 235. SGW 225 may also act as a mobility anchor during inter-base station handovers.

MME 230 may include one or more computation and communication devices that act as a control-node for the LTE access network. For example, MME 230 may perform operations to register a UE 110 with the EPS, to establish bearer channels (e.g., traffic flows) associated with a session with UE 110, to hand off UE 110 from the EPS to another network, to hand off UE 110 from the other network to the EPS, and/or to perform other operations. MME 230 may perform policing operations on traffic destined for and/or received from UE 110.

PGW 235 may include one or more network devices that may aggregate traffic received from one or more SGWs 225, and may send the aggregated traffic to an external network such as PDN 140. PGW 235 may also, or alternatively, receive traffic from the external network and may send the traffic toward a UE 110 via SGW 225, and/or base station 220.

HSS/AAA server 240 may include one or more devices that may manage, update, and/or store, in a memory associated with HSS/AAA server 240, profile information associated with a subscriber. The profile information may identify applications and/or services that are permitted for and/or accessible by the subscriber; a mobile directory number (MDN) associated with the subscriber; bandwidth or data rate thresholds associated with the applications and/or services; and/or other information. The subscriber may be associated with UE 110. Additionally, or alternatively, HSS/AAA server 240 may perform authentication, authorization, and/or accounting operations associated with the subscriber and/or a communication session with UE 110. In one implementation, the functionality performed by group coordination server 130, including maintaining identifiers that may be used to determine direct communication paths between UEs 110, may be implemented as part of the services provided by the IMS core.

In the context of FIG. 2, group coordination server 130 may be an application server that implements an IMS service to coordinate communication between UEs using direct communication paths (i.e., direct mode communications). The service implemented by group coordination server 130 may be a SIP-based service.

Although FIGS. 1 and 2 illustrate example components of environment 100, in other implementations, environment 100 may contain fewer components, different components, differently arranged components, or additional components than those depicted. Alternatively, or additionally, one or more components of environment 100 may perform one or more other tasks described as being performed by one or more other components of environment 100.

Figure 3A:
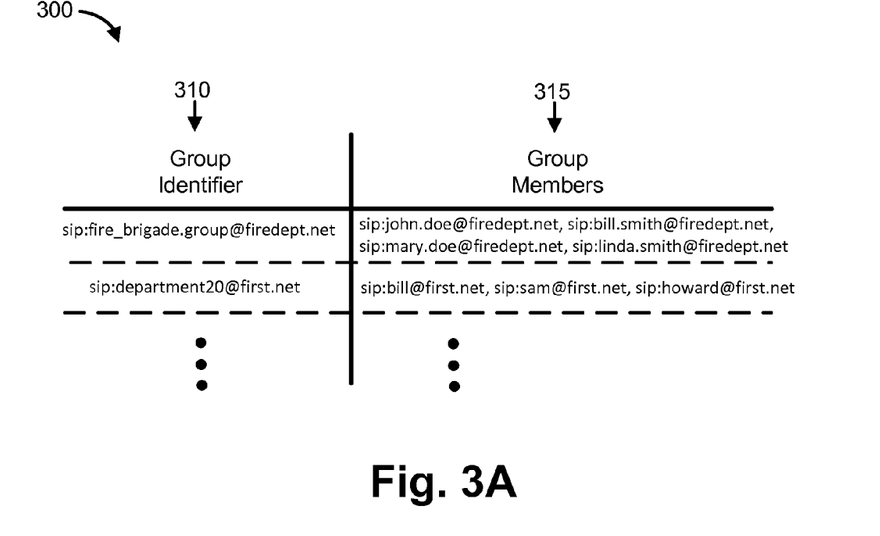
FIGS. 3A and 3B are diagrams illustrating example data structures that may be maintained by the group coordination server illustrated in FIG. 1.
Figure 3B:
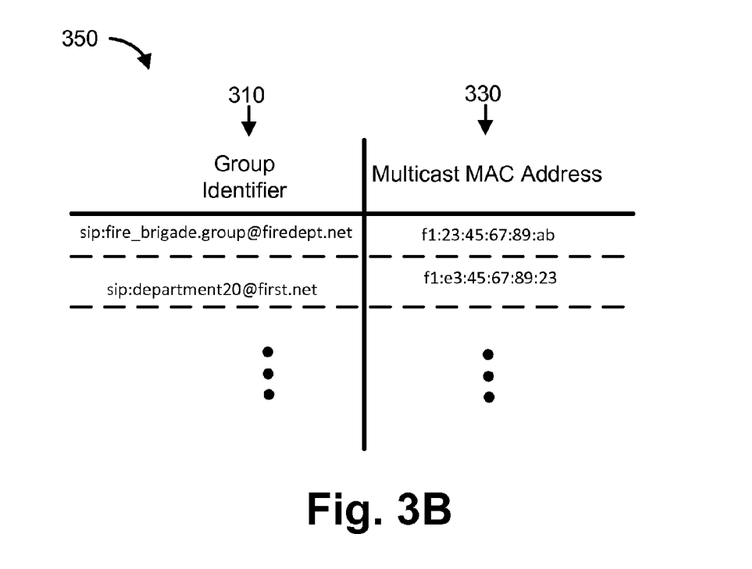

FIGS. 3A and 3B are diagrams illustrating example data structures 300 and 350, such as data structures that may be maintained by group coordination server 130. Data structure 300 may store group identifiers and user identifiers that may be used to determine direct communication paths between UEs 110. Data structure 350 may store information correlating group identifiers to particular multicast MAC addresses.

As illustrated in FIG. 3A, each record in data structure 300 may be associated with a group identifier field 310 and a group members field 315. Values for group identifier field 310 may include identifiers that define particular groups. As mentioned previously, in one implementation, the identifier may include a SIP-URI. In other implementations, the values for group identifier field 310 may be specified using other techniques. The values for group identifier field 310 may be application layer identifiers that may be modified by an administrator or other user associated with group coordination server 130.

Each group, defined by group identifier field 310, may include one or more members, which may be specified in group members field 315. In one implementation, the group members of a particular group may be specified using user identifiers, which may each include a SIP-URI that specifies a particular UE 110 or a user of a particular UE 110. In other implementations, values other than SIP-URIs may be used to identify users.

For data structure 300, two example records are illustrated: a first record corresponding to the group identifier "sip:fire_brigade.group@firedept.net" and a second record corresponding to the group identifier "sip:department20@first.net". The "fire_brigade" group ("sip:fire_brigade.group@firedept.net") may include four members: "sip:john.doe@firedept.net," "sip:bill.smith@firedept.net," "sip:mary.doe@firedept.net," and "sip:linda.smith@firedept.net." The "department20" group ("sip:fire_brigade.group@firedept.net") may include three members: "sip:bill@first.net", "sip:sam@first.net", "sip:howard@first.net".

Data structure 350 may be used to correlate group identifiers, such as one of group identifiers 310, to a multicast MAC address. Device discovery using direct mode signaling based on using multicast MAC addresses to identify a group is discussed in more detail below with respect to the implementation of FIG. 5C. As illustrated in FIG. 3B, each record in data structure 350 may include group identifier field 310 and a multicast MAC address field 330. Group identifier field 310 may correspond to group identifier field 310, as discussed with respect to FIG. 3A. Multicast MAC address field 330 may include a MAC address (e.g., a six octet value) that is linked to a specific application layer group identifier. Thus, UEs 110, in addition to storing an application layer group identifier for which the UEs are members, may store a six octet multicast MAC address that is assigned to an application layer group identifier.

A number of example records are illustrated in data structure 350. In this example, the group identifier "sip:fire_brigade.group@firedept.net" is associated with the multicast MAC address "f1:23:45:67:89:ab". The group identifier "sip:department20@first.net" is associated with the multicast MAC address "f1:e3:45:67:89:23". A number of fields were described above in the description of data structures 300 and 350. The fields described are examples. In alternative possible implementations, different, fewer, or additional fields may be implemented.

Figure 4:
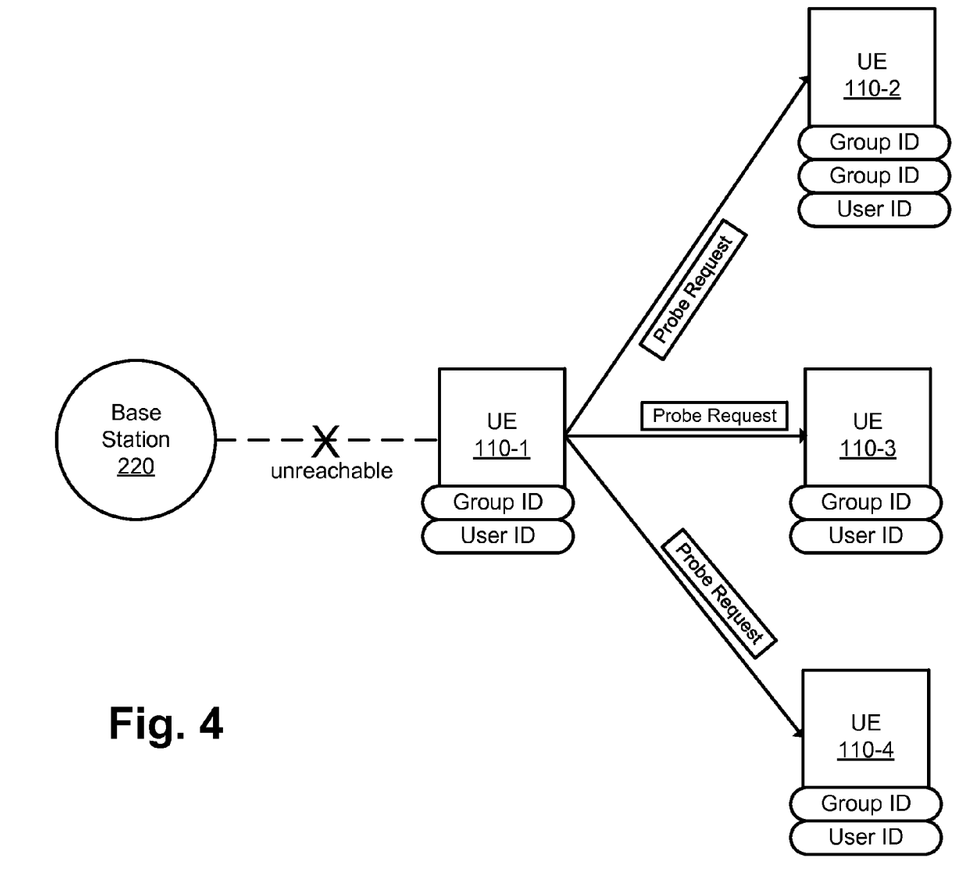
FIG. 4 is a diagram conceptually illustrating device discovery for communication devices.

FIG. 4 is a diagram conceptually illustrating device discovery for UEs. In FIG. 4, four UEs, labeled as UEs 110-1 through 110-4, and base station 220 are illustrated. A user of one of UEs 110, such as UE 110-1, may desire to establish a direct communication path between other UEs 110 located in the vicinity of UE 110-1. For example, the user of UE 110-1 may wish to broadcast a text or voice message (e.g., a "push-to-talk" short voice message) to nearby UEs that are assigned to a particular group. However, base station 220 may not be reachable from UE 110-1 (e.g., UE 110-1 may be at a location that is out of the service range of base station 220, UE 110-1 may be inside a tunnel, building or other structure that blocks communications with base station 220, etc.). It may therefore be desirable for UE 110-1 to establish direct communication paths with other UEs 110. To establish a direct communication path between other UEs 110, UE 110-1 may perform device discovery of nearby UEs 110 by broadcasting a discovery signal, referred to as a "probe request" or a "probe request frame" herein.

As is further illustrated in FIG. 4, each of UEs 110-1 through 110-4 may be associated with group identifiers ("Group ID") and/or user identifiers ("User ID"), such as the group identifiers and user identifiers maintained in data structures 300 and 350. The group identifiers and user identifiers, corresponding to each UE 110, may be stored locally by UEs 110. In one implementation, each UE 110 may be associated with a single, globally unique, user identifier. The same group identifier, in contrast, may be stored by multiple UEs 110 (e.g., all the UEs 110 that belong to the particular group). Additionally, a single UE 110, such as UE 110-2, may be associated with multiple different group identifiers, which may occur when the user of the UE belongs to multiple groups.

In one implementation, the probe requests may include an Ethernet frame (OSI layer 2 communication) that is broadcast by UE 110-1. The Ethernet frame may be broadcast via, for example, a radio interface corresponding to the Institute of Electrical and Electronics Engineers' (IEEE) 802.11 (WiFi) standard or another radio interface. An Ethernet frame may be formatted as a broadcast frame by including the broadcast address "FFFF.FFFF.FFFF" (all binary ones) as the destination device MAC address. As illustrated, UE 110-1 may transmit a probe request to all UEs within radio range of UE 110-1. The probe request may be a broadcast Ethernet frame that may, in some implementations, be re-broadcast by the receiving UEs (e.g., UEs 110-2 through 110-4).

Formats for various implementations of the probe requests are described in more detail below with respect to FIGS. 5A-5C. Each probe request may include a group identifier and/or a user identifier that represents the group or user that is the intended target for discovery using direct mode signaling. As mentioned, the group identifier and/or user identifier may be an application layer identifier that may be assigned and/or changed in response to changes in group membership changes or for other reasons. UEs 110-2 through 110-4, in response to reception of a probe request, may compare the user identifier and/or group identifier, included in the probe request, to a user identifier and/or group identifier(s) that are stored by UEs 110-2 through 110-4, respectively.

Figure 5A:
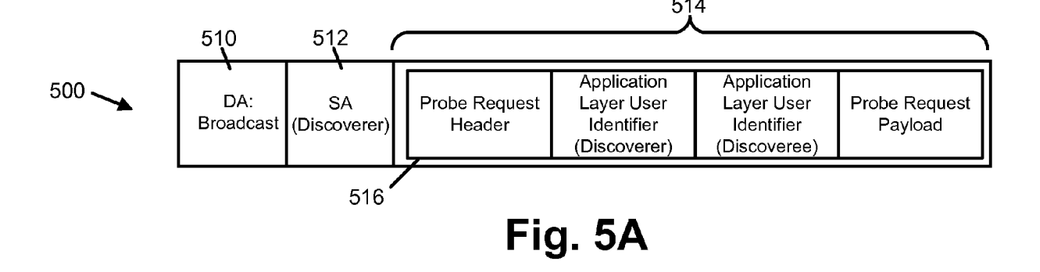
FIGS. 5A, 5B, and 5C are diagrams illustrating example request probe formats that may be used to initiate targeted device discovery.
Figure 5B:
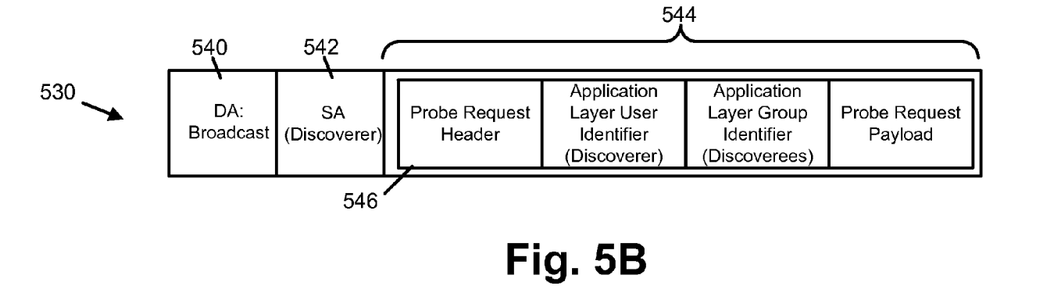
Figure 5C:
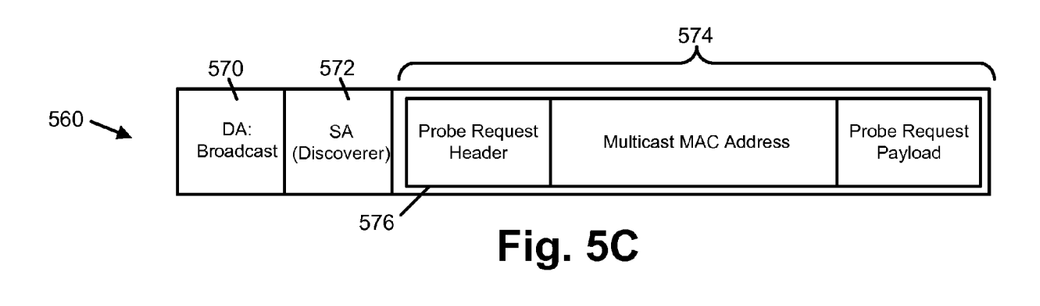

FIGS. 5A, 5B, and 5C are diagrams illustrating request probe formats to initiate targeted device discovery. In FIGS. 5A-5C, the request probe formats are illustrated as Ethernet frames. The request probes may be transmitted as layer-2 (MAC sublayer) frames.

The probe request of FIG. 5A may represent a probe request that can be used for targeted device discovery of a single user. As illustrated, the layer-2 frame carrying the probe request signaling message 500 may include destination address (DA) 510, source address (SA) 512, and payload 514. Destination address 510 may be set by the device that initially broadcasts request probe 500 (i.e., the "discoverer" device), as a MAC broadcast address. MAC broadcast frames may be set to the MAC address value of hexadecimal "FFFF.FFFF.FFFF" (all binary ones), or to another address value that indicates that the frames are broadcast frames. Source address 512 may be set to the address, such as the peer-to-peer address (e.g., MAC address), of the discoverer device.

Payload 514 may include a probe request signaling message 516, which may include a probe request header, the application layer user identifier of the discoverer, the application layer user identifier of a discoveree (i.e., the target user for the direct mode communication), and other payload information for the probe request signaling message. The probe request header may include a value that indicates that the frame is a probe request frame. The application layer user identifier of the discoverer may correspond to a user identifier, such as a SIP-URI that is associated with the user of the device (e.g., a user identifier corresponding to a user identifier in group members field 315 of data structure 300). In contrast to device discovery techniques using layer-2 addressing information (e.g., MAC addresses), the SIP-URIs may not be limited in size and may be associated with particular users rather than hardware devices. Similarly, the application layer user identifier of the discoveree may correspond to an application layer user identifier, such as a SIP-URI that is associated with the user of the discoveree device (e.g., a user identifier corresponding to a user identifier in group members field 315 of data structure 300). The probe request payload information for the probe request may include additional information relating to the establishment of the direct communication path between the discoverer and the discoveree devices, such as information relating to a protocol and/or parameters that are to be used to establish the direct communication path.

The probe request of FIG. 5B may represent a probe request that can be used for targeted device discovery of members of a group. As illustrated, the layer-2 frame carrying the probe request signaling message 530 may include destination address (DA) 540, source address (SA) 542, and payload 544. Destination address 540 may be set, by the discoverer device that broadcasts request probe 530, as a MAC broadcast address (e.g., all binary ones). Source address 542 may be set to the address, such as the peer-to-peer address (e.g., MAC address), of the discoverer device.

Payload 544 may include probe request signaling message 546, which may include a probe request header, the application layer user identifier of the discoverer, the application layer group identifier of the discoverees, and other payload information for the probe request signaling message. The probe request header may include a value that indicates that the frame is a probe request frame. The application layer user identifier of the discoverer may correspond to a user identifier, such as a SIP-URI that is associated with the user of the device. The application layer group identifier of the discoverees may correspond to an application layer group identifier, such as a SIP-URI that defines the targeted group (e.g., a group identifier in group identifier field 310). The probe request payload information for the probe request may include additional information relating to the establishment of the direct communication path between the discoverer and the discoveree devices, such as information relating to protocols and/or parameters that are to be used to establish the direct communication paths.

FIG. 5C illustrates an example probe request 560 that can be used for targeted device discovery of members of a group. Probe request 560 may be useful for targeted discovery that maintains frame-level format compatibility for existing targeted device discovery standards corresponding to targeted device discovery in WiFi Direct®. As illustrated, the layer-2 frame carrying the probe request signaling message 560 may include destination address (DA) 570, source address (SA) 572, and payload 574. Destination address 570 may be set, by the discoverer device that broadcasts request probe 560, as a MAC broadcast address (e.g., all binary ones). Source address 572 may be set to the address, such as the peer-to-peer address (e.g., MAC address), of the discoverer device.

Payload 574 may include a probe request signaling message 576, which may include a probe request header, a multicast MAC address, and payload information for the probe request. The probe request header may include a value that indicates that the frame is a probe request frame. The multicast MAC address may be a MAC address (e.g., a six octet value) that is linked to a specific application layer group identifier. For example, UEs 110, in addition to storing an application layer group identifier for which the UEs are members, may store a six octet multicast MAC address that is assigned to an application layer group identifier. The discoveree UEs may determine whether the multicast MAC address is linked to an application layer group identifier for which the UE is a member. The probe request payload, similar to the probe request payload discussed for probe requests 500 and 530, may include additional information relating to the establishment of the direct communication path between the discoverer device and the discoveree device, such as information relating to protocols and/or parameters that are to be used to establish the direct communication paths.

Figure 6:
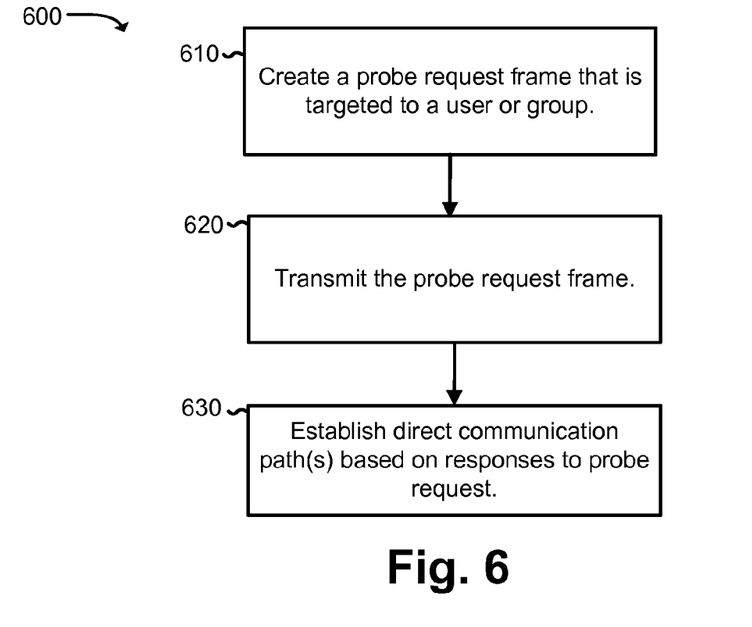
FIGS. 6 and 7 are flow charts illustrating an example processes for establishing a direct communication path between communication devices.

FIG. 6 is flow chart illustrating an example process 600 for establishing a direct communication path between UEs. Process 600 may be implemented, for example, by a UE 110 that is initiating a direct communication path (e.g., a discoverer). The establishment of the direct communication path may be performed at the OSI Layer 1 (physical)/Layer 2 (MAC) sublayers.

Process 600 may include creating a probe request frame that is targeted to a user or group of users (block 610). The probe request frame may be used to perform targeted device discovery of the UEs corresponding to the targeted user or group of users. In some implementations, direct communications between UEs may be automatically attempted when a connection to wireless network 120 is unavailable. In other implementations, direct communications between UEs may be performed in response to an explicit indication from a user that a direct mode connection is desired.

The probe request frame may be created using a format similar to the example formats indicated in FIG. 5A, 5B, or 5C. For example, when a discovery using direct mode signaling is desired with a single other user, the format of probe request 500 (FIG. 5A) may be used. When discovery using direct mode signaling is desired with a group of other users, the format of probe requests 530 (FIG. 5B) or 560 (FIG. 5C) may be used.

Process 600 may further include transmitting the probe request frame (block 620). In one implementation, the probe request frame may be an Ethernet frame that is broadcast using a wireless standard such as one of the IEEE 802.11-based standards.

UEs that receive the probe request frame may, when the probe request frame is targeted to the user of the receiving device, respond to the probe request frame. Process 600 may further include establishing the direct communication path, between UEs, based on the received responses (block 630). The direct communication path may be used, for example, to communicate text messages, implement a conference call, or broadcast "walkie-talkie" type push-to-talk messages.

Figure 7:
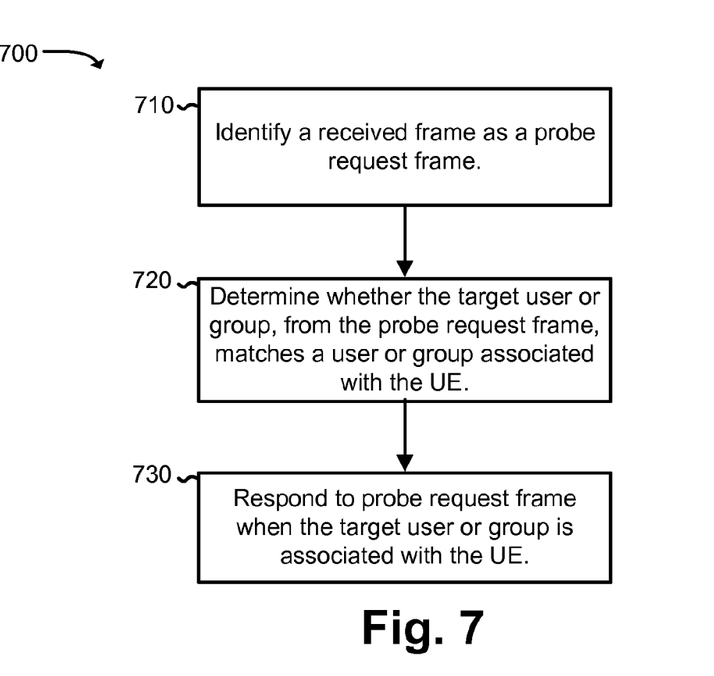

FIG. 7 is flow chart illustrating an example process 700 for establishing a direct communication path between UEs. Process 700 may be implemented, for example, by a UE 110 that is a target device for a direct communication path (e.g., a discoveree).

Process 700 may include identifying a received frame as a probe request frame (block 710). A frame may be identified as a probe request frame when the destination address (e.g., destination address 510, 540, or 570) of the frame is set to a multicast address and/or the value for the probe request header matches a predetermined value that indicates the frame is a probe request frame.

Process 700 may further include determining whether the target user or group, from the probe request frame, matches a user or group associated with the UE (block 720). As previously mentioned, UEs 110 may store the user identifier associated with the user of the UE and the group identifier (or identifiers) of the group for which the user is a member. UE 110 may compare these identifiers to the application layer group or user identifier included in the probe request frame. A match may indicate that the probe request is intended for the UE.

In implementations in which the probe request is formatted as illustrated in FIG. 5C, the UE may compare the multicast MAC address in probe request section 576 to a MAC address of the UE and to one or more multicast MAC addresses stored by the UE and linked to group identifiers. When the multicast MAC address in probe request section 576 matches the MAC address of the UE, the discoveree UE 110 may determine that a direct communication path has been requested between the discoverer (the UE 110 that originated the probe request frame) and the discoveree UE 110. When the multicast MAC address in probe request section 576 matches one of the multicast MAC addresses stored by the UE, a direct communication path may be determined to have been requested between the discoverer UE and the UEs in the corresponding group of UEs (including the discoveree UE). In this manner, in the implementation of FIG. 5C, the discoveree UE may also identify whether the probe request is intended for the discoveree UE as either a request to initiate group-based direct communication paths or a single device to device direct communication path.

Process 700 may further include responding to the probe request frame when the target user or group is associated with the UE (block 730). The discoveree UE 110 that receives the probe request frame may respond to the discoverer UE based on the source address of the discovering UE (e.g., source address 512, 542, or 572 of probe request frame 500, 530, and 560, respectively).

Figure 8:
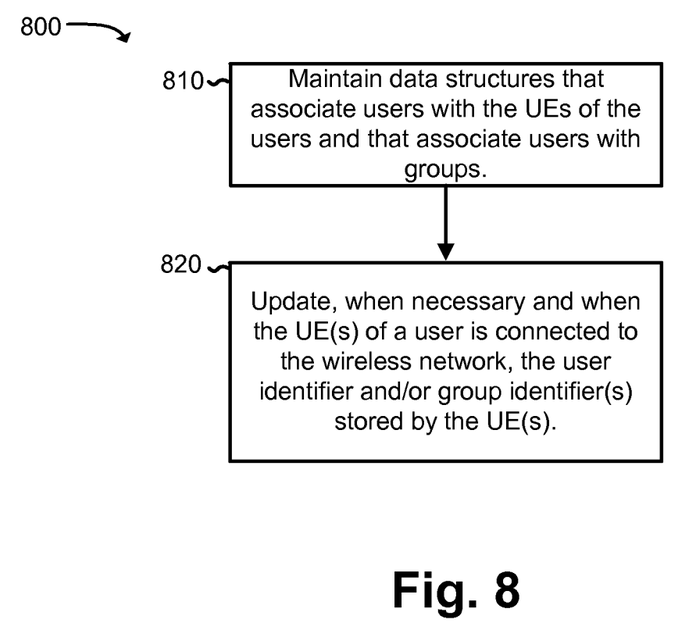
FIG. 8 is flow chart illustrating an example process for interacting with communication devices to maintain device and group identifiers at the communication devices.

FIG. 8 is flow chart illustrating an example process 800 for interacting with UEs to maintain device and group identifiers at the UEs. Process 800 may be implemented by, for example, group coordination server 130.

Process 800 may include maintaining data structures that associate users with the UEs of the users and that associate users with groups (block 810). As previously mentioned, an administrator or other user associated with a particular group may update a data structure, such as data structure 300, that defines the users for a particular group. Similarly, a data structure, such as data structure 350, may be used to keep track of particular users and the UEs that are associated with the particular users.

Process 800 may further include, updating, when necessary and when the UE of a user is connected to the wireless network, the user identifier and/or group identifier(s) stored by the UE (block 820). For example, when a user is added to a group, group coordination server 130 may transmit the group identifier to the UE associated with the user. Similarly, when a user is removed from a group, group coordination server 130 may transmit an indication, to the UE associated with the user, to remove the user from the group.

Figure 9:
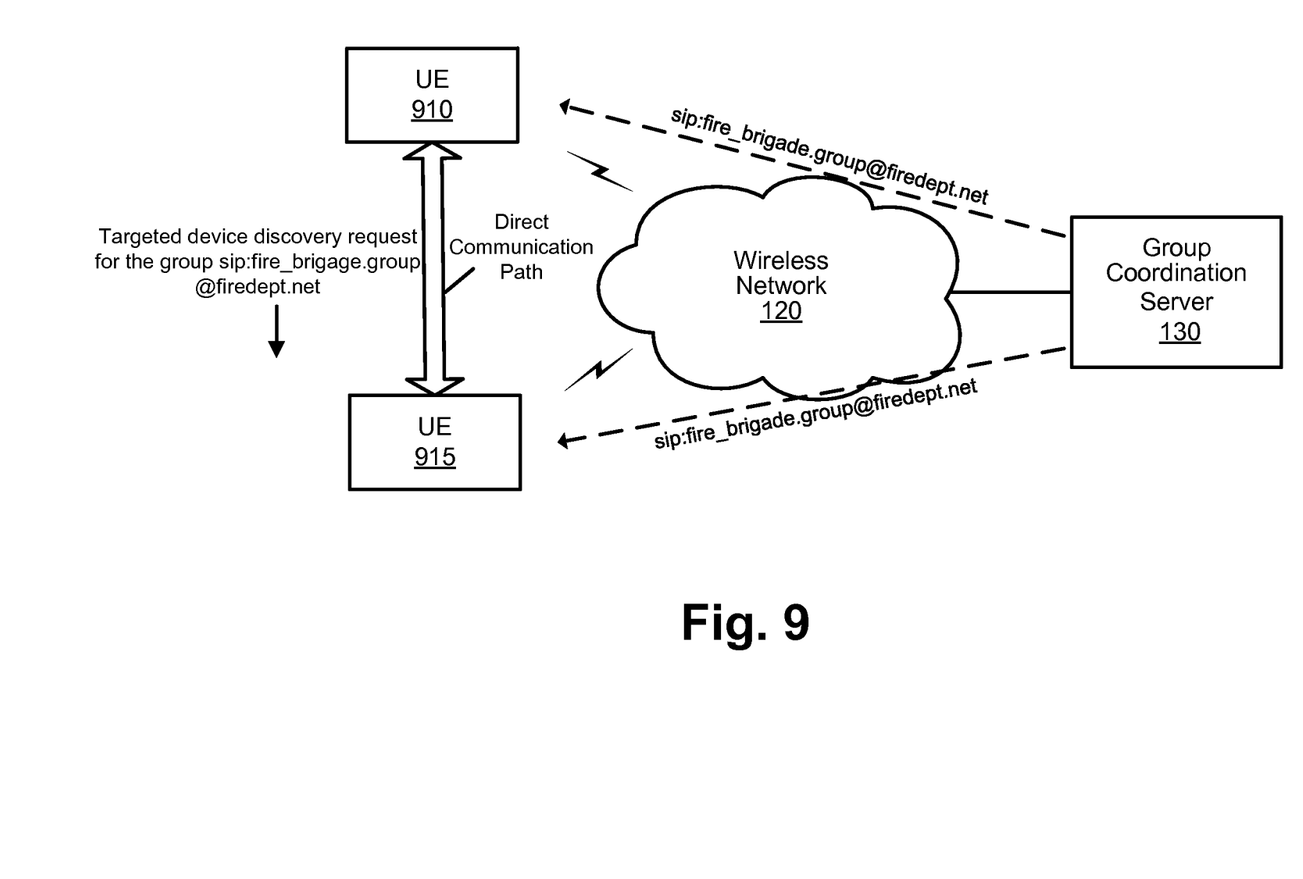
FIG. 9 is a diagram conceptually illustrating an example of the creation of direct communication paths between communication devices based on targeted discovery of a communication device using a group identifier.

FIG. 9 is a diagram conceptually illustrating an example of the creation of direct communication paths between UEs based on targeted discovery of a UE using a group identifier. As shown in FIG. 9, two example UEs, labeled as UE 910 and UE 915, may each be attached to wireless network 120 (e.g., a wireless cellular network). The users of UE 910 and UE 915 may each be a member of a group, such as a group associated with an application layer group identifier. In this example, the group identifier may be the SIP-URI: "sip: fire_brigade.group@firedept.net" and the group may include a group of public safety personnel (e.g., firefighters). While UEs 910 and 915 are attached to wireless network 120, group coordination server 130 may transmit the group identifier to UEs 910 and 915.

At some point, a user of UE 910 may desire to form a direct communication path (e.g., without going through wireless network 120) with users of the group, such as UE 915. For example, the users of UEs 910 and 915 may be in a situation in which coverage from wireless network 120 is not available. UE 910 may broadcast a probe request frame, such as a probe request frame formatted as illustrated in FIG. 5B, to perform targeted device discovery for users of the group. UE 915 may receive the probe request frame and may respond by creating a direct communication path with UE 910. UE 910 and 915 may subsequently communicate over the direct communication path.

Figure 10:
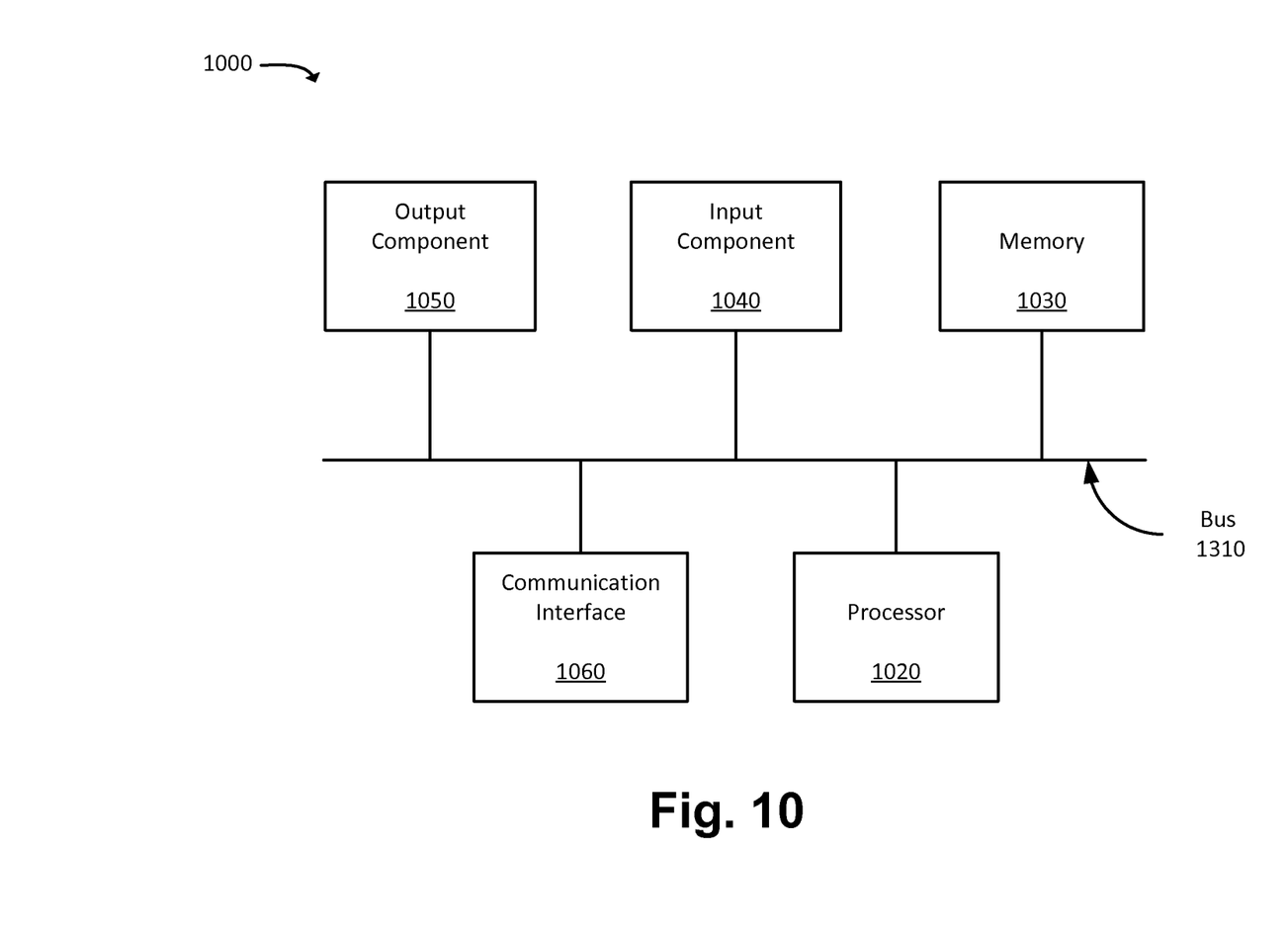
FIG. 10 is a diagram of example components of a device.

FIG. 10 is a diagram of example components of a device 1000. Each of the devices illustrated in FIGS. 1, 2, 4, and 9 may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 6-8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. User equipment (UE) comprising:
a non-transitory computer readable medium containing program instructions; and
one or more processors, to execute the program instructions to:
receive a first application layer identifier that uniquely identifies a user of the UE;
form a layer-2 frame, the layer-2 frame including, in a payload portion of the layer-2 frame:
a field designating the layer-2 frame as a device discovery frame for discovery using direct mode signaling between the UE and one or more other UEs,
the first application layer identifier, and
a second application layer identifier corresponding to a group, with which discovery using direct mode signaling is to be performed, the group including the user of the UE, as identified by the first application layer identifier, and one or more other users associated with one or more other UEs and one or more other first application layer identifiers; and
wirelessly broadcast the layer-2 frame.

2. The UE of claim 1, wherein the first and second application layer identifiers include session initiation protocol (SIP)-uniform resource identifiers (URIs).

3. The UE of claim 1, wherein the one or more processors are further to execute the program instructions to:
form the layer-2 frame to additionally include, outside of the payload portion of the layer-2 frame, a layer-2 address of the UE.

4. The UE of claim 1, wherein the one or more processors are further to execute the program instructions to:
receive a response, from the one or more other UEs, to the layer-2 frame; and
complete, based on the response, discovery using direct mode signaling between the UE and the one or more other UEs.

5. The UE of claim 1, wherein the first and second application layer identifiers are received via communications with an Internet Protocol (IP) Multimedia Subsystem (IMS) service in a Long Term Evolution (LTE) network.

6. The UE of claim 1, wherein the one or more processors are further to execute the program instructions to:
form the layer-2 frame based on a determination that network connectivity to a cellular wireless network is unavailable.

7. A method for performing discovery of devices using direct mode signaling, the method comprising:
receiving, by a communication device and from a server, a first application layer identifier that identifies a group in which a user of the communication device is a member, the group additionally including one or more other users associated with one or more other communication devices;
receiving, by the communication device and from the server, a first multicast layer-2 address that corresponds to the first application layer identifier;
receiving, by the communication device and from a second communication device, a layer-2 frame, the layer-2 frame including:
a field including a layer-2 address of the second communication device;
a field designating the layer-2 frame as a device discovery frame for discovery using direct mode signaling between the communication device and the second communication device, and
a second multicast layer-2 address; and
completing, by the communication device, discovery using direct mode signaling with one or more members of the group, including the second communication device, when the first multicast layer-2 address matches the second multicast layer-2 address.

8. The method of claim 7, wherein the layer-2 address, the first multicast layer-2 address, and the second multicast layer-2 address are six octet values.

9. The method of claim 7, wherein the first application layer identifier includes a session initiation protocol (SIP)-uniform resource identifier (URIs).

10. The method of claim 7, wherein the first application layer identifier is received via communications with an Internet Protocol (IP) Multimedia Subsystem (IMS) service in a Long Term Evolution (LTE) network.

11. A communication device comprising:
a non-transitory computer readable medium storing:
program instructions,
a first application layer identifier that identifies a group in which a user of the communication device is a member, the group additionally including one or more other users associated with one or more other communication devices, and
a first multicast layer-2 address that corresponds to the first application layer identifier;
one or more processors, to execute the program instructions to:
receive, from a second communication device, a layer-2 frame, the layer-2 frame including:
a field including a layer-2 address of the second communication device;
a field designating the layer-2 frame as a device discovery frame for discovery using direct mode signaling between the communication device and the second communication device, and
a second multicast layer-2 address; and complete discovery using direct mode signaling with one or more members of the group, including the second communication device, when the first multicast layer-2 address matches the second multicast layer-2 address.

12. The communication device of claim 11, wherein the layer-2 address, the first multicast layer-2 address, and the second multicast layer-2 address are six octet values.

13. The communication device of claim 11, wherein the first application layer identifier includes a session initiation protocol (SIP)-uniform resource identifier (URIs).

14. The communication device of claim 11, wherein the first application layer identifier is received via communications with an Internet Protocol (IP) Multimedia Subsystem (IMS) service in a Long Term Evolution (LTE) network.

15. A communication device for performing discovery of devices using direct mode signaling, the communication device comprising:
  means for storing a first application layer identifier that uniquely identifies a user of the communication device;
  means for forming a layer-2 frame, the layer-2 frame including
    a field designating the layer-2 frame as a device discovery frame for discovery using direct mode signaling between the communication device and one or more other devices,
    the first application layer identifier, and
    a second application layer identifier corresponding to a group, with which discovery using direct mode signaling is to be performed, the group including the user of the UE, as identified by the first application layer identifier, and one or more other users associated with one or more other UEs and one or more other first application layer identifiers; and
  means for wirelessly broadcasting the layer-2 frame.

16. The communication device of claim 15, wherein the first and second application layer identifiers include session initiation protocol (SIP)-uniform resource identifiers (URIs).

17. The communication device of claim 15, further comprising:
  means to form the layer-2 frame to additionally include a layer-2 address of the UE.

18. The communication device of claim 15, further comprising:
  means to receive a response, from the one or more other devices, to the layer-2 frame; and
  means to complete, based on the response, discovery using direct mode signaling between the communication device and the one or more other devices.

19. The device of claim 15, wherein the first and second application layer identifiers are received via communications with an Internet Protocol (IP) Multimedia Subsystem (IMS) service in a Long Term Evolution (LTE) network.

20. The device of claim 15, further comprising:
  means for forming the layer-2 frame based on a determination that network connectivity to a cellular wireless network is unavailable.

* * * * *